H. WILSON.
FLEXIBLE METAL JOINT.
APPLICATION FILED AUG. 25, 1919.

1,374,129. Patented Apr. 5, 1921.

Inventor
H. Wilson.
By Geo. F. Kimmel
Attorney.

UNITED STATES PATENT OFFICE.

HIRAM WILSON, OF MONDOVI, WISCONSIN.

FLEXIBLE METAL JOINT.

1,374,129.　　　　　Specification of Letters Patent.　　　Patented Apr. 5, 1921.

Application filed August 25, 1919. Serial No. 319,760½.

*To all whom it may concern:*

Be it known that I, HIRAM WILSON, a citizen of the United States, residing at Mondovi, in the county of Buffalo and State of Wisconsin, have invented certain new and useful Improvements in Flexible Metal Joints, of which the following is the specification.

The invention relates to a flexible joint construction, and more particularly to the class of universal pipe couplings or joints.

The primary object of the invention is the provision of a coupling or joint of this character, wherein the male member is in the form of a hollow ball, while the female member is in the form of a sectional socket correspondingly shaped to and adapted to rotatably receive the male member, so that the coupling or joint will be freely flexible and can turn so that one pipe section can be disposed at varying angles to another pipe section when joined by the coupling or joint.

Another object of the invention is the provision of a coupling or joint of this character wherein the formation thereof affords universal connection between pipe sections so that the same will be freely flexible at the point of the joint whereby one pipe section can be swung angularly with respect to the other without the possibility of leakage at the joint, the coupling or joint being of novel form so as to eliminate any possibility of the separation of the parts thereof, yet said parts can be detached from each other when the occasion requires.

A further object of the invention is the provision of a coupling or joint of this character, which is extremely simple in construction, thoroughly reliable and efficient in its purpose, readily and easily assembled and disassembled, strong, durable and inexpensive to manufacture and install.

Other objects of the invention will be in part obvious and in part hereinafter pointed out.

The invention accordingly consists in the elements and combination of parts, the construction of which will be exemplified in the description following and the scope of the application of which will be indicated in the claims hereunto appended.

In the accompanying drawing.

Similar reference characters indicate corresponding parts throughout the several views in the drawings.

Figure 1:
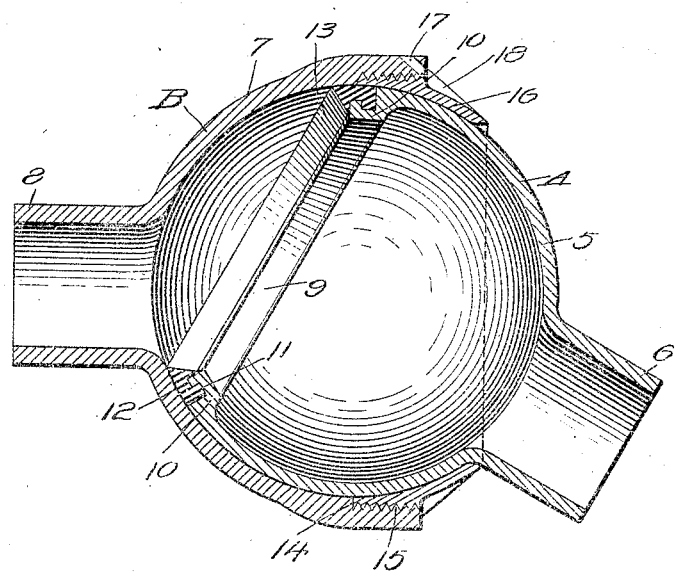
Figure 1 is a vertical longitudinal sectional view taken through a universal pipe joint or coupling constructed in accordance with the invention.
Figure 2:
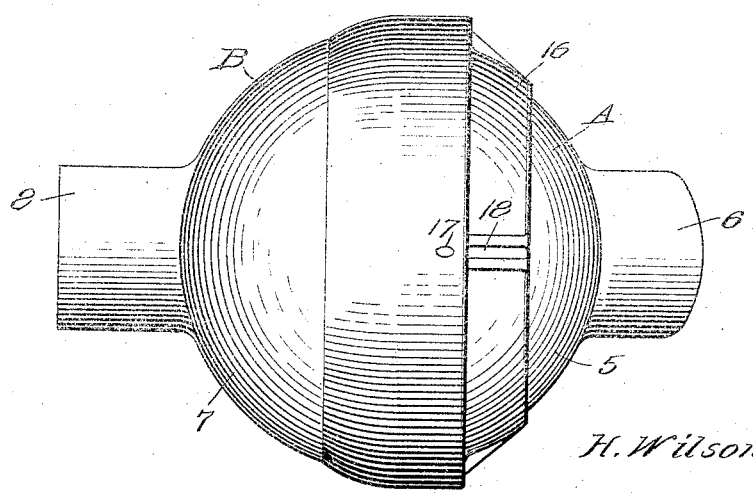
Fig. 2 is an elevation thereof.

Referring to the drawings in detail, the universal joint or coupling comprises a male member A and a female member B respectively, the male member being formed with a hollow ball-shaped end 5 and an opposite nipple end or pipe extension 6, which may have detachably connected therewith a pipe section (not shown) or the latter may be integrally formed with the same, while the female member B is formed with a hollow ball-shaped end 7, and an opposite nipple end or pipe extension 8, which latter may be detachably connected with a pipe section (not shown) or integrally formed therewith.

The ball-shaped end 5 of the male member A is truncated at a point remote from the nipple or pipe extension 6, to provide a circular relatively large opening 9 and the edge circumferentially of this opening is thickened at the inner periphery thereof as at 10, the outer periphery of said thickened edge being formed with a packing seat 11, which is annular and has engaged therein a packing ring 12, which is formed with a folded over edge 13 overlying the thickened edge 10 of the opening 9, the ball-shaped end 5 of the said male member A being fitted within the ball-shaped end 7 of the female member B and the packing ring 12, contacts with the inner surface of said ball-shaped end 7 of the female member and is held engaged in the seat 11 thereby.

The ball-shaped end 7 of the female member B is truncated to provide an opening for permitting the insertion of the male member A in said female member B and the edge concentrically of the opening in the ball-shaped end 7, is formed with an annular internal recess, providing an inner abutment shoulder 14, within the ball-shaped end 7, while the surface of said recess is provided with screw threads 15, for the detachable engagement of an externally threaded retaining collar 16, with the said edge circumferentially of the opening in the ball-shaped end 7, the collar 16, being adapted to retain and secure the ball-shaped end 5 of the male member A in the ball-shaped end 7 of the female member B yet permitting free turning movement of said end 5 within the end 7, whereby the nipple ends or pipe extensions 6 and 8 of the respective sections can swing to variable angles and at a maximum degree relative to each other.

The collar 16, can be worked inwardly in the recess formed in the edge circumferentially of the opening in the ball-shaped section 7 to abut the shoulder 14 and by the adjustment of this collar 16, a snug fit can be had between the ball-shaped ends 5 and 7 of the male and female members respectively when interfitted with each other, while the packing ring 12, will avoid any possible leakage between the said ends 5 and 7 in their interfitted relation to each other.

The recessed edge circumferentially of the opening in the ball-shaped section 7 of the female member B has formed therein a diagonally disposed hole or passage 17, while the external portion of the collar 16 is formed with a notch 18, adapted to register with said opening or passage 17, so that a cotter pin when inserted through the opening or passage 17, will engage the notch 18 for the locking of the collar 16, against turning movement within the ball-shaped section 7 of the female member B and thus the said collar 16, will be held fast in its engaged position in the female member B, so that there is no possibility of the accidental working loose of the collar during the universal movement of the coupling or joint.

The salient feature of the coupling or joint hereinbefore described, resides in the mounting of the packing ring 12, on the male member A, and the securing of the retaining collar 16, in its engaged position in the female member B of the coupling or joint construction.

It will be obvious that the coupling or joint permits a maximum degree of universal action thereof, so that the nipple ends or pipe extensions 6 and 8 of the male and female members can swing to variable angles with respect to each other.

The packing ring 12 is caused to effect a tight closure between the male and female members A and B, so as to avoid leakage therebetween as the fluid pressure within the coupling or joint will act upon the folded edge 13, of said packing ring 12, and cause it to firmly brace against the inner surface of the ball-shaped end 7 of the female member.

From the foregoing, it is though that the construction and manner of operation of the member or joint will be clearly understood, and therefore a more extended explanation has been omitted.

What is claimed is:

1. A universal joint of the character described comprising male and female members, each being formed with a ball-shaped end and a pipe extension, the ball-shaped end of the male member being fitted within the ball-shaped end of the female member, a retaining collar having screw-threaded engagement with the interior of the ball-shaped end of the female member and holding the ball-shaped end of the male member fitted therein, said ball-shaped end of the female member and the collar being formed with angular registering openings and adapted to receive a locking pin for securing the collar engaged with the ball-shaped end of the female member.

2. A universal joint of the character described, comprising male and female members, each being formed with a ball-shaped end and a pipe extension, the ball-shaped end of the male member being fitted within the ball-shaped end of the female member, a retaining collar lying contiguous with said male member and having screw threaded engagement with the interior of the ball-shaped end of the female member and holding the ball-shaped end of the male member fitted therein, said ball-shaped end of the female member and the collar being formed with angular registering openings and adapted to receive a locking pin for securing the collar engaged with the ball-shaped end of the female member, said ball-shaped end of the male member being formed with an annular packing ring seat in the outer surface thereof, and a packing ring engaged in said seat and contacting with the internal surface of the ball-shaped end of the female member and held in said seat thereby.

HIRAM WILSON.